US012771690B2

(12) United States Patent
Al Ghamdi et al.

(10) Patent No.: US 12,771,690 B2
(45) Date of Patent: Oct. 20, 2026

(54) METHOD AND SYSTEM FOR ENABLING MULTI-FACTOR AUTHENTICATION FOR INCOMPATIBLE THIRD-PARTY RADIUS CLIENTS USING A PROXY SERVER

(71) Applicant: Saudi Arabian Oil Company, Dhahran (SA)

(72) Inventors: Hafed A. Al Ghamdi, Dammam (SA); Faisal A. Julaidan, Dammam (SA); Maryah A. Alghamdi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 174 days.

(21) Appl. No.: 18/627,714

(22) Filed: Apr. 5, 2024

(65) Prior Publication Data

US 2025/0317444 A1 Oct. 9, 2025

(51) Int. Cl.
*H04L 29/06* (2006.01)
*H04L 9/40* (2022.01)

(52) U.S. Cl.
CPC ...... *H04L 63/0884* (2013.01); *H04L 63/0435* (2013.01); *H04L 63/20* (2013.01)

(58) Field of Classification Search
CPC . H04L 63/0884; H04L 63/0435; H04L 63/20; H04L 63/10; H04L 63/0263; H04L 63/08
See application file for complete search history.

(56) References Cited

U.S. PATENT DOCUMENTS 7,657,639 B2 2/2010 Hinton
10,701,056 B2 6/2020 Murthy
10,944,631 B1 * 3/2021 Ganapathi ............... H04L 67/06
2004/0107360 A1 * 6/2004 Herrmann ............... H04L 63/20 726/1

FOREIGN PATENT DOCUMENTS

CN 1455551 A * 11/2003

OTHER PUBLICATIONS

No author; Plan NPS as a Radius proxy; Windows learn; https://learn.microsoft.com/en-us/windows-server/networking/technologies/nps/nps-plan-proxy; Jul. 29, 2021, 7 pages.

* cited by examiner

*Primary Examiner* — Longbit Chai
(74) *Attorney, Agent, or Firm* — Leason Ellis LLP

(57) ABSTRACT

A computer-implemented method for enabling multi-factor authentication for incompatible third-party Remote Authentication Dial-In User Service ("RADIUS") clients includes a proxy server. The proxy server receives an authentication request from a particular RADIUS client. The proxy server then validates the request for compatibility with a RADIUS server and determines whether the request must be modified. Then, the proxy server forwards the validated and modified authentication request to the RADIUS server which triggers a response from the RADIUS server. Subsequently, the RADIUS server response is translated into a compatible format for the particular, third-party RADIUS client and is then forwarded from the RADIUS server back to that particular, third-party RADIUS client. Also disclosed is a system for enabling multi-factor authentication for incompatible third-party RADIUS clients using a proxy server.

18 Claims, 4 Drawing Sheets

METHOD AND SYSTEM FOR ENABLING MULTI-FACTOR AUTHENTICATION FOR INCOMPATIBLE THIRD-PARTY RADIUS CLIENTS USING A PROXY SERVER

FIELD OF THE DISCLOSURE

The present disclosure relates generally to the field of information technology and information security, and more specifically to a system and method for integrating incompatible third-party Remote Authentication Dial-In User Service (RADIUS) clients with a RADIUS server for multi-factor authentication using a proxy server that acts as an intermediary, adapting authentication requests and responses to achieve compatibility and streamline the MFA process.

BACKGROUND OF THE DISCLOSURE

The evolution of information security in recent years has seen a significant shift towards the adoption of Multi-Factor Authentication (MFA) as a means of reinforcing access control mechanisms. Within the realm of user authentication, the Remote Authentication Dial-In User Service (RADIUS) has traditionally been a widely accepted protocol for enabling network access. However, challenges have arisen due to the diverse range of third-party RADIUS clients entering the market, many of which exhibit certain levels of incompatibility with existing RADIUS servers.

The issue at hand is multifaceted. The reality of modern networks is that not all RADIUS clients share uniform compatibility with the diverse assortment of RADIUS servers deployed by various organizations. It is not uncommon for third-party RADIUS clients to utilize different versions or dialects of the protocol, which can lead to discrepancies in the attributes or formats expected by the RADIUS server during the authentication exchange. Such inconsistencies often result in failed authentication attempts, thereby obstructing user access or even defeating the purpose of having a secure and efficient authentication system.

Prior attempts to resolve this compatibility conundrum have included alterations to the RADIUS clients themselves. However, this approach is invariably constrained by the varying degrees of flexibility offered by different client manufacturers. Furthermore, customizing each client separately can be immensely resource-intensive and impractical, particularly for organizations with an array of client applications. These adjustments also entail a continuous commitment to maintenance with every new client version released, further escalating the cost and operational complexities.

Conventional integration methods have also involved the deployment of multiple RADIUS solutions within the same organizational infrastructure, each tailored to specific client types or authentication mechanisms. This not only significantly increases the administrative overhead but also amplifies the risk of service outages due to the complex interdependencies between system components. Achieving high availability under these conditions becomes an intricate and costly endeavour, demanding a sophisticated design and redundancy strategies for each component involved.

Another outmoded approach to this technical problem has been to consult vendors to modify their enterprise solutions to be compatible with a given RADIUS environment. Alternatively, organizations can consider acquiring dedicated RADIUS servers that are designed to be compatible with their specific enterprise solutions. Both these routes are associated with hefty expenditures in terms of financial investment and the time required for implementation. These strategies offer short-term relief but fail to address the root cause of the compatibility challenge, leaving organizations vulnerable to recurring costs as new incompatibilities arise over time.

Additionally, a search for existing solutions and vendor offerings has revealed a scarcity of comprehensive answers to this integration issue. There appears to be a gap in the market for a solution that allows the seamless integration of incompatible third-party RADIUS clients with various RADIUS servers without necessitating expensive and time-consuming product modifications or additional dedicated RADIUS server deployments. Existing literature and past solutions seemingly focus on specific authentication methods or protocols, rather than the overarching issue of RADIUS incompatibility across the board.

The persistent problem of integrating incompatible third-party RADIUS clients with RADIUS servers compels organizations to seek cost-effective solutions that do not compromise on security or functional capability. The integration process not only needs to cater to the divergent attributes and formats between disparate RADIUS components but also must address the operational overheads and maintenance challenges involved therein. As organizations continue to strive for enhanced security measures, the need for a universal, adaptable, and efficient solution to this pressing compatibility issue remains a significant concern within the field of information security. The present disclosure addresses this and other unresolved needs in the art.

SUMMARY OF THE DISCLOSURE

In one or more implementations, a method is disclosed for a computer-implemented method that allows multi-factor authentication for third-party Remote Authentication Dial-In User Service (RADIUS) clients through a proxy server. This method involves a series of steps conducted by the proxy server's hardware processor.

In one or more variations, initially, the proxy server receives an authentication request from a RADIUS client. The proxy server is configured by code executing therein to check the request to see if it's compatible with the RADIUS server and determine if the request needs to be changed. If necessary, the request is modified on the proxy server. Then, the adjusted request is sent from the proxy server to the RADIUS server. The proxy server then gets a reply from the RADIUS server which it translates, using further code executing therein, into a compatible format for the third-party RADIUS client. Lastly, the proxy server sends the translated response back to the third-party RADIUS client.

According to one or more additional aspects of the present disclosure, when validating requests, the proxy server can be further configured by code executing therein to identify any attributes that the RADIUS server might be missing. In further aspects, in the course of executing code to determine if changes are needed, the proxy server is configured to compare the received request with compatible ones. In some aspects, when the code determines that the request requires modification for computability with the RADIUS server, it adds any necessary attributes that were missing from the initial request. In one or more implementations, the proxy server can be further configured to omit any attributes from the request that the RADIUS server does not need. In further implementations, a simulation tool can be used to set up the proxy server. Moreover, in some implementations, the proxy server is configured to compare the request with a predetermined compatible request captured by a simulation tool.

In yet further implementations, when receiving a RADIUS server response, the proxy server can be further configured by code executing therein to determine whether the user should be allowed or denied access. Alternatively, or in addition, in some implementations, the RADIUS server itself may be configured by code to algorithmically take responsibility for allowing or denying user access. Consistent with various implementations, translating the RADIUS server response involves converting the response to a compatible format for a particular third-party client. In some variations, to ensure secure communication with the RADIUS server, the proxy server can be configured to use an encrypted channel and a shared secret. In one or more further variants, translating the server's response involves having the processor apply prescribed logic required by the third-party client, wherein the prescribed logic can be stored in a memory device accessible to the processor.

In one or more implementations, a system is also disclosed which includes a proxy server and a processor that communicate with each other and work together to enable multi-factor authentication for a variety of third-party RADIUS clients. This system acts as an intermediary for these clients and the RADIUS server, ensuring requests and responses are compatible. The processor of the proxy server is configured by code which enables the proxy server to verify and alter authentication requests, and then translate and relay them. Responses from the RADIUS server are received and converted to suitable formats.

In some implementations, the system can be configured by further code to authenticate requests by pinpointing missing or surplus attributes. In various aspects, the system can be further configured to define which attributes are needed or are not needed for a given situation based on the RADIUS server's criteria. According one or more variations, secure communication with the RADIUS client and server is possible thanks to the establishment of a shared secret. In further variations, translating responses includes using prescribed logic to meet the diverse requirements of different third-party clients, as noted above. In further aspects, protocol conversion ensures that messages fit RADIUS communication standards. In additional variations, the system can include a FreeRADIUS server of The FreeRADIUS Server Project and Contributors, or the like, which is configured by code to handle request modifications. According to one or more aspects, failsafe protocols can be part of the system to guarantee ongoing service. Finally, in some implementations, the system can be further configured to recognize and discard request attributes that would lead to rejection by the RADIUS server.

The details of one or more implementations are set forth in the accompanying drawings and the description below. Other features will be apparent from the description, from the drawings, and from the claims.

BRIEF DESCRIPTION OF THE DRAWINGS

The foregoing and other objects and advantages of the present disclosure will become more apparent when considered in connection with the following detailed description and appended drawings in which like designations denote like elements in the various views, in which.

DETAILED DESCRIPTION OF CERTAIN EMBODIMENTS CONSISTENT WITH THE DISCLOSURE

Figure 1:
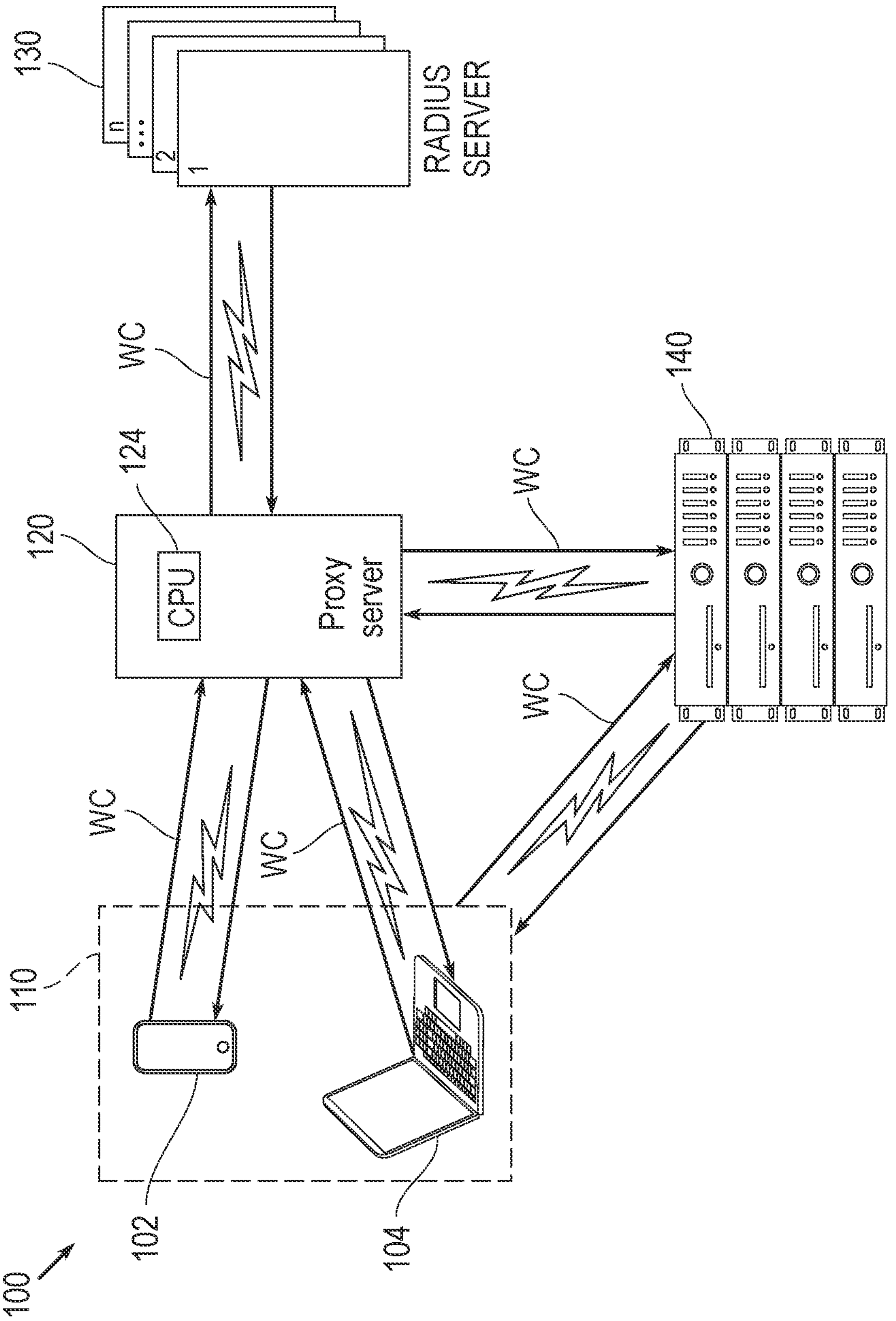
FIG. 1 is a system enabling multi-factor authentication for incompatible third-party RADIUS clients using a customized proxy server.

The present disclosure relates to the field of information technology security and pertains to a cutting-edge method and system solution that integrates multi-factor authentication ("MFA") with incompatible third-party Remote Authentication Dial-In User Service ("RADIUS") clients through implementation of an intermediary proxy server. The disclosure describes the configuration of a proxy server to mediate communication between any one or more of a variety of non-conformant RADIUS clients and a RADIUS server or servers, typically within an enterprise network. The so-configured intermediary proxy server ensures that authentication requests, which often originate from an incompatible RADIUS client, is verified and adjusted by the proxy server to match the RADIUS server's requirement. In effect, the system successfully facilitates MFA, enhancing security while simplifying the adoption of a wide array of RADIUS clients and network access points.

Embodiments consistent with the disclosure all include a proxy server configured—via code executing on a processor housed within and communicatively connected within the proxy server—to receive and comprehend both RADIUS client requests and server responses, thereby identifying and remedying any deficient or surplus attributes. The proxy server's configuration, guided in some implementations by a simulation tool's output, enables modification of the requests, leading to end-to-end network device compatibility. During development of the present disclosure, inventor contributions were pivotal in effectively utilizing tools such as FreeRadius to transform client requests into an acceptable format for the RADIUS server. This process underpins a complete MFA system, relying on the proxy server's interplay with the RADIUS clients and a RADIUS server or servers.

From a technical standpoint, the present disclosure addresses and resolves integration challenges encountered when RADIUS servers reject requests from incompatible clients due to missing or non-standard access request attributes. The placement of a configurable proxy server as a mediator harmonizes the exchange of attributes and caters to the standard formats required by prevalent RADIUS servers. Users that stand to benefit from the present disclosure include remote desktop users, mobile phone users who need access to an enterprise network, satellite offices, and those similarly positioned. The method and system disclosed herein offers a systematic approach to authenticating user access to internal IT resources, embedding checks and modifications to assure both the validity and security of each network access authentication attempt.

The cost-saving implications of the present disclosure are noteworthy, especially for large organizations, where adopting MFA solutions for incompatible systems can escalate expenses significantly. Requiring third-party vendors to modify applications to align with deployed RADIUS servers is financially onerous. The innovative approach detailed herein eliminates such costs, offering a single, versatile platform that enables MFA for various applications.

FIG. 1 is a system 100 enabling multi-factor authentication for incompatible third-party RADIUS clients using a customized proxy server. It depicts the system elements required to implement a computer-implemented method for enabling multi-factor authentication for incompatible third-party Remote Authentication Dial-In User Service ("RADIUS") clients using a proxy server, consistent with one or more embodiments of the present disclosure. In various embodiments, the method steps are performed by a hardware processor (CPU 124) housed within and communicatively connected within the proxy server 120 which executes code that configures the proxy server 120.

Cell phone 102 and laptop 104 are examples of third-party network user devices utilizing RADIUS clients 110 consistent with some implementations of the present disclosure. Users use such devices to attempt to access enterprise network resources through a two-way data transmission such as wireless or wired connection (WC). Often, such access requires processing a user authentication request using a RADIUS server 130 or RADIUS servers 130. A RADIUS server is a central server that provides authentication and authorization services for remote users who access a network. RADIUS clients 110 are network access servers (such as wireless access points, 802.1X authenticating switches, virtual private network (VPN) servers, and dial-up servers) because they use the RADIUS protocol to communicate with RADIUS servers such as Network Policy Server (NPS) servers. A network access server (NAS) is a device that provides some level of access to a larger network. A NAS using a RADIUS infrastructure is also a RADIUS client, sending connection requests and accounting messages to a RADIUS server for authentication, authorization, and accounting. Client computers, such as laptop computers and other computers running client operating systems, are not RADIUS clients but may utilize RADIUS clients to access RADIUS servers.

In systems consistent with the present disclosure, a network user's laptop 104, cell phone 102, or other third-party network user device(s) are wirelessly connected to a terminal 140. In various implementations, terminal 140 is a server running as a RADIUS client to pass requests from one or more user devices, such as user devices 102 and 104, to the proxy server (120). In some implementations, such user devices 102 and 104 utilize a RADIUS client 110 and are wirelessly connected (WC) to an enterprise RADIUS client server 140, which incorporates a server running a RADIUS client. This is sometimes referred to as remote desktop access.

In order to access enterprise network resources, network users often have to authenticate their login credentials, according to one or more implementations of the present disclosure. Frequently, however, the user's device may be operating an incompatible third-party RADIUS client. According to systems consistent with the present disclosure, when a user attempts to authenticate their network access credentials while using an incompatible third-party RADIUS client 110, the RADIUS client forwards the user's authentication request to a proxy server 120.

Configuration and operation of the proxy server 120, through execution of code running on a processor 124 housed and communicatively connected within the proxy server, is a salient aspect of the present disclosure.

Figure 2:
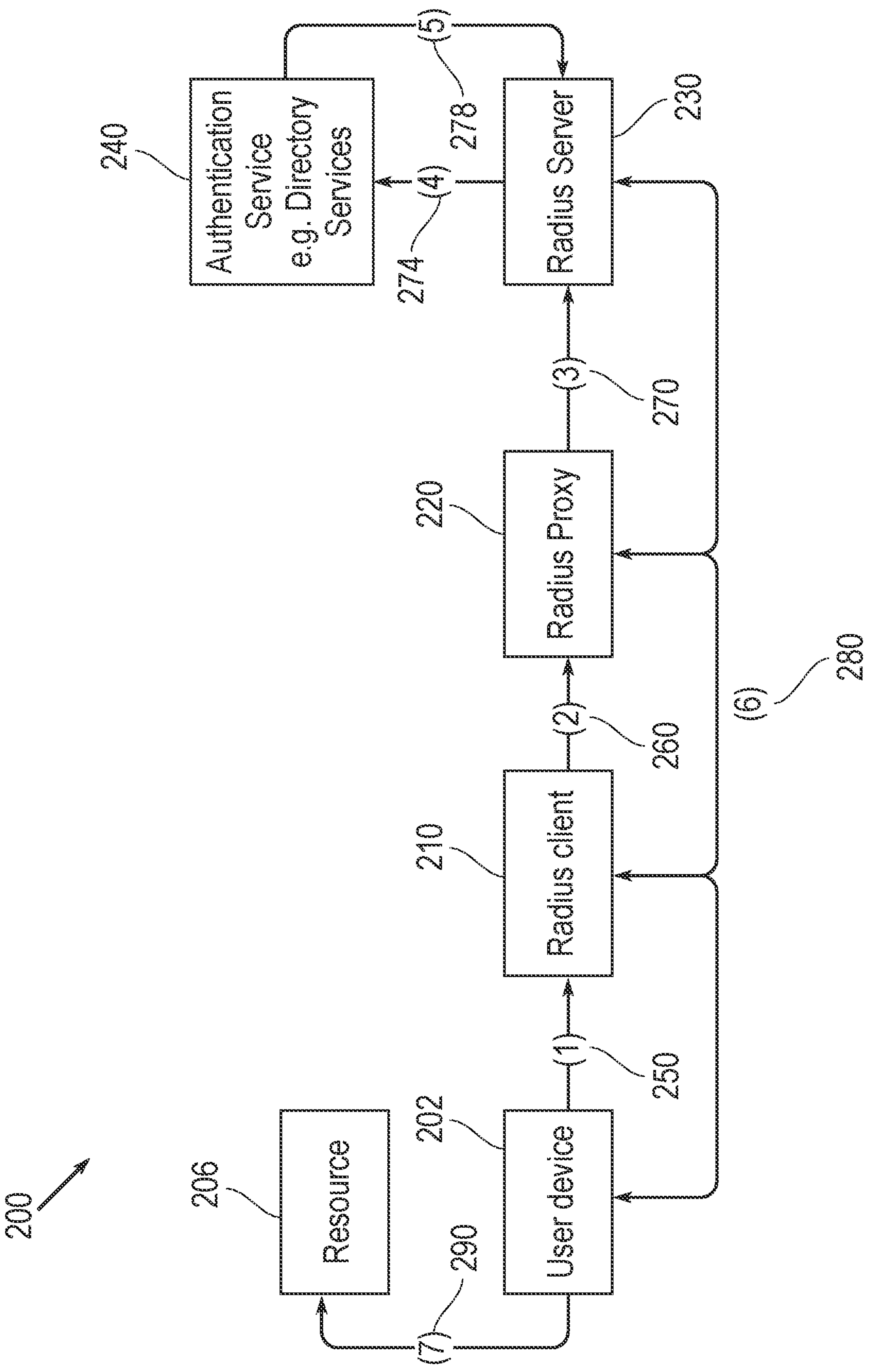
FIG. 2 is a dataflow diagram depicting representative steps concerning a user's attempt to access a network resource requiring RADIUS server authentication via a proxy server, consistent with one or more implementations of the present disclosure.

FIG. 2 is a dataflow diagram 200 depicting the steps involved in a user's attempt to access a network resource requiring RADIUS server authentication via a proxy sever consistent with one or more implementations of the present disclosure.

In one or more implementations, the proxy server 220 is configured, by code executing in a processor housed within and communicatively connected within the proxy server, to perform a series of checks, modifications, and to take actions on an access request initiated by a user device 202 (as indicated by arrow 250). Then, the access request is forwarded (as indicated by arrow 260) by a RADIUS client 210 to the proxy server 220. The proxy server's purpose is to ensure the access request's validity and compatibility with a network RADIUS server. If an access request passes validation checks when screened at the proxy server 220, or if the access request is properly modified by the proxy server in a manner consistent with the present disclosure (by identifying and removing superfluous attributes or adding missing-but-necessary attributes), the proxy server, acting in response to the code executing therein, forwards it—as indicated by arrow 270—to the RADIUS server 230 for authentication and authorization.

In keeping with the one or more method implementations described above, the RADIUS server 230 then transmits the access request attributes to an authentication service 240, such as a multi-factor authentication service or directory service—this transmission is depicted as arrow 274. If the code running the authentication service 240 determines that the access request is valid, access is authorized, and a response (arrow 278) is sent to the RADIUS server 230. Then, the RADIUS server is configured to transmit the response back to the proxy server 220, depicted as arrow(s) 280, where the proxy server 220 is configured to then translate the response into a format compatible with the incompatible RADIUS client 210. Once translated, the response is sent to the RADIUS client 210—once again depicted as arrows 280—and then forwarded once again to the user device 202. At this point, user device 202 is granted access to network resource 206 (arrow 290).

The process of a user accessing a network resource utilizing RADIUS clients and a RADIUS server or servers through use of a configurable proxy server consistent with various embodiments of the present disclosure can be understood through a series of method steps, which the FIG. 2 dataflow diagram 200 depicts. First, a user initiates a login authentication from their user device 202 in order to access an internal IT resource. Thus, an authentication request is sent to the RADIUS client 210 (marked as "(1)" in FIG. 2). Second, the RADIUS client forwards the request to the proxy server 220 (marked as "(2)" in FIG. 2), which involves the step of receiving, at the proxy server 220, an authentication request from the RADIUS client 210. Third, the proxy server performs a series of checks and modifications on the request to ensure its validity and compatibility with a RADIUS server or servers 230.

This process involves the following steps performed by executing code on a processor contained within and electrically connected to the proxy server 220: validating the received authentication request for compatibility with a RADIUS server or servers 230; determining whether modification of the request is required; and modifying the received authentication request, if during the last step it was determined that modification of the request is required. Fourth, the proxy server 220 forwards the validated (and modified, if necessary) authentication request (marked as "(3)" in FIG. 2) to the RADIUS server 230 for authentication and authorization. Fifth, the RADIUS server 230 then communicates (marked as "(4)" in FIG. 2) with an authentication service 240 to check the authority of the user based on the provided input and targeted IT service. Sixth, a response is returned from the authentication service 240 to the RADIUS server (marked as "(5)" in FIG. 2) allowing or denying the request. Seventh, the response is forwarded from the RADIUS server 230 and received by the proxy server 220 (marked as "(6)" in FIG. 2) where it is translated into a compatible format for the third-party RADIUS client 210. Eighth, the response is forwarded by the proxy server 220 back to the RADIUS client 210 (also marked as "(6)" in FIG. 2), which then forwards it to the initiating user device 202 (again marked as "(6)" in FIG. 2). Ninth and finally, in the case of successful authentication, the initiating user device 202 is granted access to and redirected to the desired IT resource 206 (marked as "(7)" in FIG. 2); in the case of unsuccessful authentication, the user device 202 may receive a message informing the user of the unsuccessful attempt.

Figure 3:
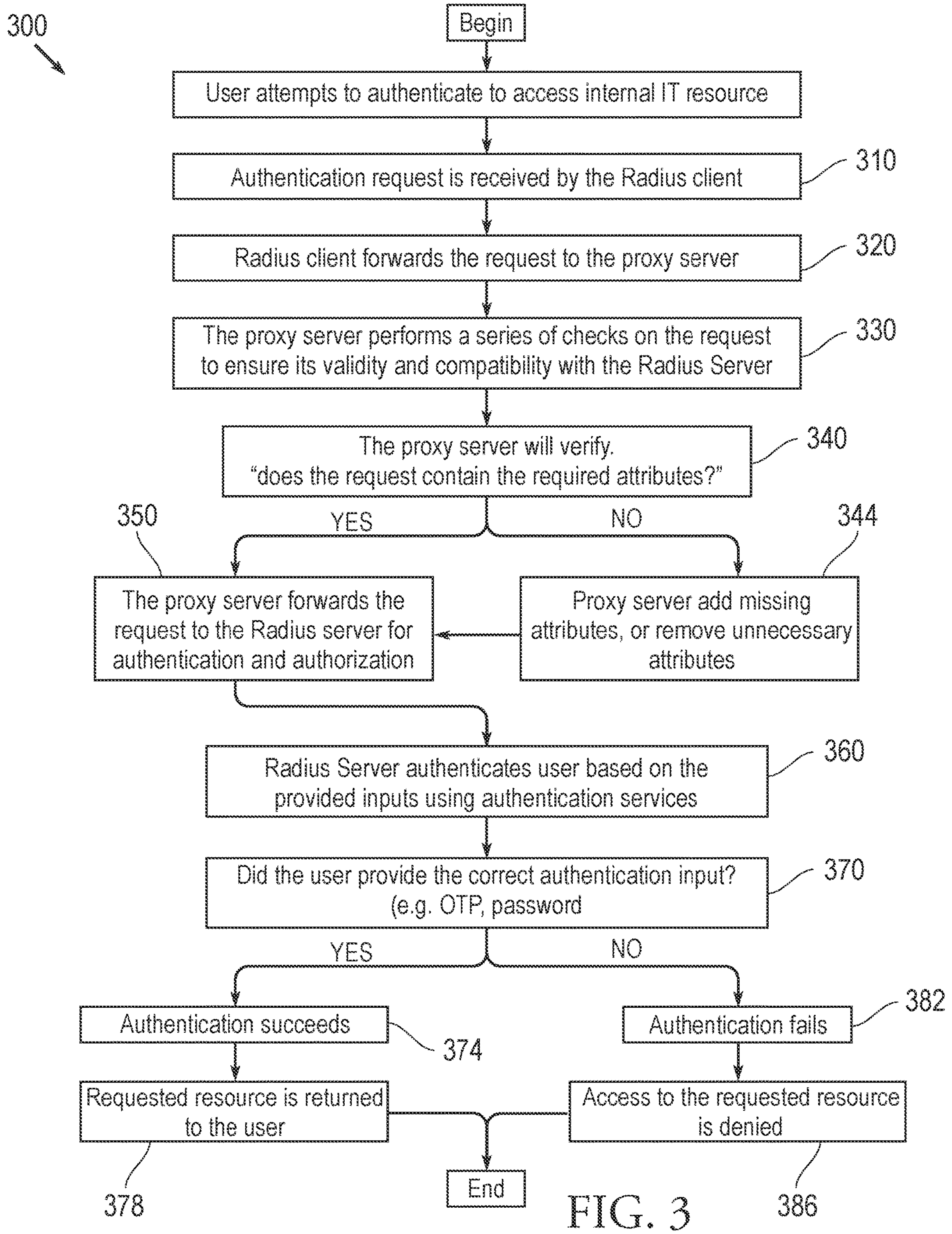
FIG. 3 is an additional flowchart illustrating representative steps taken on an access request as it is processed in order to gain access to a network resource requiring RADIUS server authentication via a proxy server, consistent with an implementation of the present disclosure.

FIG. 3 is an additional flowchart 300 illustrating the steps taken on an access request as it is processed in order to gain access to a network resource requiring RADIUS server authentication via a proxy sever consistent with an implementation of the present disclosure.

The flowchart 300 begins when a user seeks to authenticate their credentials and obtain access to an internal IT resource. At step 310, the authentication request is received by a RADIUS client. At step 320, the RADIUS client forwards the request to the proxy server. At step 330, the proxy server is configured by code to perform a series of checks on the request to ensure its validity and compatibility with a RADIUS sever or servers.

At step 340, the proxy server is configured by code to verify whether the request contains required attributes for compatibility with the RADIUS server or servers. If at step 340 the answer is "no," then at step 344 the program executing in the proxy server adds missing attributes, if any, and removes unnecessary or superfluous attributes, if any. Once that is done, at step 350, the proxy server is configured to forward the request to the RADIUS server for authentication and authorization. On the other hand, if at step 340 the answer is "yes," then at step 350, the proxy server is configured to forward the unmodified request to the RADIUS server for authentication and authorization.

At step 360, the RADIUS server contributes to authenticating a user by initiating a programmed authentication process (step 370) wherein the inputs the user provided at the beginning of the process are transmitted to an authentication service. If at step 370 the program determines that the user provided correct authentication inputs, then the process proceeds to step 374 indicating authentication success. Subsequently, and upon successful authentication, at step 378 the user is supplied with or redirected to the requested resource and the process ends. If at step 370 it is determined that the user did not provide correct authentication inputs, then the process proceeds to step 382 indicating authentication failure. Subsequently, and upon unsuccessful authentication, at step 386 the user is denied access to the requested resource and the process ends.

Figure 4:
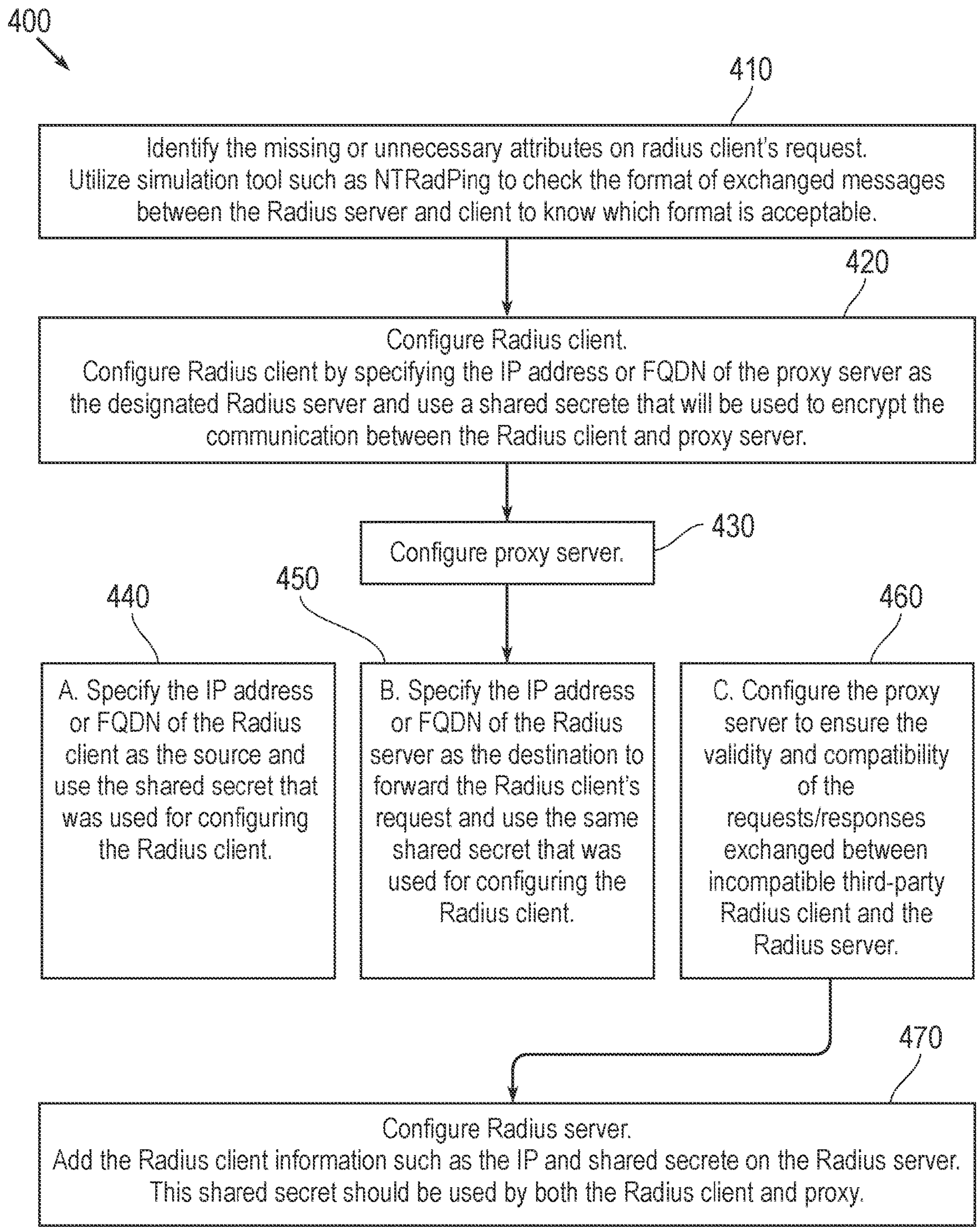
FIG. 4 is a descriptive dataflow diagram 400 showing steps consistent with one or more implementations of the present disclosure suitable for configuring end-to-end compatibility of third-party client devices with an enterprise RADIUS server for multi-factor authentication through application of a designated proxy server that verifies and, if necessary, modifies access requests.

FIG. 4 is a descriptive dataflow diagram 400 showing steps consistent with one or more implementations of the present disclosure suitable for configuring end-to-end compatibility of third-party client devices with an enterprise RADIUS server for multi-factor authentication through application of a designated proxy server that verifies and, if necessary, modifies access requests.

FIG. 4 further clarifies a salient aspect of one or more embodiments of the present disclosure for addressing situations in which, for example, RADIUS clients are running different versions or dialects of the RADIUS protocol. This situation requires different attributes/formats in the exchanged messages with a RADIUS server. This frequently makes it difficult or impossible to authenticate users seeking to securely access network resources. Introduction of a configurable proxy server for message validation and modification between incompatible RADIUS clients and RADIUS servers, consistent with all embodiments of the present disclosure, ensures required attributes are included in all RADIUS client messages sent to a RADIUS sever. In one or more implementations, introduction of the configurable proxy server intermediary also ensures all messages sent to the RADIUS server include correct formatting that is acceptable by and compatible with the RADIUS server after altering the RADIUS client's request.

FIG. 4 further illustrates the validation, determination, and modification of incoming and outgoing authentication requests at the proxy server by code executing on a processor housed within and communicatively connected within the proxy server, according to one or more implementations of the present disclosure. When a user attempts to authenticate with unsupported RADIUS client, first, the client forwards the authentication request to the configured proxy server (step 410). At this first step 410, the proxy server identifies missing or unnecessary (i.e., superfluous) attributes on the RADIUS client's request.

Examples are depicted in the tables below of failed and successful authentication requests without and with the use of a proxy server according to one or more embodiments of the present disclosure. Wireshark was used to capture failed and successful authentication requests. Wireshark is a free and open-source packet analyzer made available by the Wireshark Foundation. It is used for network troubleshooting, analysis, software and communications protocol development, and education.

TABLE 1

| FAILED REQUEST EXAMPLE | |
|---|---|
| STAGE ONE: Access-Request | STAGE TWO: Access-Reject |
| Frame 3804: 135 bytes on wire (1080 bits), 135 bytes captured (1080 bits) on interface \Device\NPF_{ redacted }, id 0<br>Ethernet II, Src: redacted, Dst: redacted<br>Internet Protocol Version 4, Src: 10.0.0.1, Dst: 10.0.0.3 | Frame 3869: 62 bytes on wire (496 bits), 62 bytes captured (496 bits) on interface \Device\NPF_{ redacted }, id 0<br>Ethernet II, Src: redacted (redacted), Dst: redacted (redacted) |

TABLE 1-continued

| FAILED REQUEST EXAMPLE | |
|---|---|
| STAGE ONE: Access-Request | STAGE TWO: Access-Reject |
| User Datagram Protocol, Src Port: redacted, Dst Port: redacted<br>RADIUS Protocol<br>Code: Access-Request (1)<br>Packet identifier: 0xba (186)<br>Length: 93<br>Authenticator: redacted<br>[The response to this request is in frame 3869]<br>Attribute Value Pairs<br>AVP: t=NAS-Port(5) l=6 val= redacted<br>AVP: t=NAS-IP-Address(4) l=6 val= redacted<br>AVP: t=User-Name(1) l=25 val = username@domain.com<br>AVP: t=User-Password(2) l=18 va l= Decrypted: pass123<br>AVP: t-Message-Authenticator(80) l=18 val = redacted | Internet Protocol Version 4, Src: 10.0.0.3, Dst: 10.0.0.1<br>User Datagram Protocol, Src Port: redacted, Dst Port: redacted<br>RADIUS Protocol<br>Code: Access-Reject (3)<br>Packet identifier: 0xba (186)<br>Length: 20<br>Authenticator: redacted<br>[This is a response to a request in frame 3804]<br>[Time from request: 0.039928000 seconds] |

In the Table 1 failed request example above, RADIUS Client (10.0.0.1) is attempting to transmit an authentication request to RADIUS Server (10.0.0.3). The request in the left column include User-Password and Message-Authenticator attributes. The request is rejected by the RADIUS sever because the RADIUS server did not expect both attributes to be part of the first request coming from the RADIUS Client.

TABLE 2

| SUCCESSFUL REQUEST EXAMPLE | |
|---|---|
| STAGE ONE: Access-Request | STAGE TWO: Access-Challenge |
| Frame 7667: 89 bytes on wire (712 bits), 89 bytes captured (712 bits) on interface \Device\NPF_{ redacted }, id 0<br>Ethernet II, Src: redacted (redacted), Dst: redacted (redacted)<br>Internet Protocol Version 4, Src: 10.0.0.2, Dst: 10.0.0.3<br>User Datagram Protocol, Src Port: redacted, Dst Port: redacted<br>RADIUS Protocol<br>Code: Access-Request (1)<br>Packet identifier: 0x5d (93)<br>Length: 47<br>Authenticator: redacted<br>[The response to this request is in frame 7845]<br>Attribute Value Pairs<br>AVP: t=NAS-Port(5) l=6 val= redacted<br>AVP: t=NAS-IP-Address(4) l=6 val= redacted<br>AVP: t=User-Name(1) l=10 val= username@domain.com<br>AVP: t=Proxy-State(33) l=5 val= redacted | Frame 7845: 152 bytes on wire (1216 bits), 152 bytes captured (1216 bits) on interface \Device\NPF_{ redacted }, id 0<br>Ethernet II, Src: redacted (redacted), Dst: redacted (redacted)<br>Internet Protocol Version 4, Src: 10.0.0.3, Dst: 10.0.0.2<br>User Datagram Protocol, Src Port: redacted, Dst Port: redacted<br>RADIUS Protocol<br>Code: Access-Challenge (11)<br>Packet identifier: 0x5d (93)<br>Length: 110<br>Authenticator: redacted<br>[This is a response to a request in frame 7667]<br>[Time from request: 0.062994000 seconds]<br>Attribute Value Pairs<br>AVP: t=Proxy-State(33) l=5 val= redacted<br>AVP: t=Reply-Message(18) l=71 val=Please respond to the challenge: SMS challenge sent to mobile device.<br>AVP: t=State(24) l=14 val= redacted |
| STAGE THREE: Access-Request | STAGE FOUR: Access-Accept |
| Frame 11403: 121 bytes on wire (968 bits), 121 bytes captured (968 bits) on interface \Device\NPF_{ redacted }, id 0<br>Ethernet II, Src: redacted (redacted), Dst: redacted (redacted)<br>Internet Protocol Version 4, Src: 10.0.0.2, Dst: 10.0.0.3<br>User Datagram Protocol, Src Port: redacted, Dst Port: redacted<br>RADIUS Protocol<br>Code: Access-Request (1)<br>Packet identifier: 0xc2 (194)<br>Length: 79<br>Authenticator: redacted<br>[The response to this request is in frame 11542]<br>Attribute Value Pairs<br>AVP: t=NAS-Port(5) l=6 val=1<br>AVP: t=NAS-IP-Address(4) l=6 val= redacted<br>AVP: t=State(24) l=14 val= redacted<br>AVP: t=User-Name(1) l=10 val= username@domain.com | Frame 11542: 113 bytes on wire (904 bits), 113 bytes captured (904 bits) on interface \Device\NPF_{ redacted }, id 0<br>Ethernet II, Src: redacted (redacted), Dst: redacted (redacted)<br>Internet Protocol Version 4, Src: 10.0.0.3, Dst: 10.0.0.2<br>User Datagram Protocol, Src Port: redacted, Dst Port: redacted<br>RADIUS Protocol<br>Code: Access-Accept (2)<br>Packet identifier: 0xc2 (194)<br>Length: 71<br>Authenticator: redacted<br>[This is a response to a request in frame 11403]<br>[Time from request: 0.067742000 seconds]<br>Attribute Value Pairs<br>AVP: t=Proxy-State(33) l=5 val= redacted<br>AVP: t=Class(25) l=46 val= redacted |

TABLE 2-continued

| SUCCESSFUL REQUEST EXAMPLE |
|---|
| AVP: t=User-Password(2) l=18 val=Decrypted: 483484 (OTP)<br>AVP: t=Proxy-State(33) l=5 val= redacted |

In the Table 2 successful request example above, a RADIUS Client is transmitting an authentication request to a Proxy Server (10.0.0.2) which then transmits to a RADIUS Server (10.0.0.3). The transmission and authentication is successful because the User-Password and Message-Authenticator attributes sent in STAGE ONE above were removed by the proxy server, through execution of code similar to the code for modifying authentication requests further below in the disclosure. At STAGE TWO in the table above, the RADIUS Server accepted the request and sent an authentication "challenge" back. At STAGE THREE in the table above, the RADIUS client, thorough the proxy server, sent another request with a one-time password (OTP) to meet the challenge. The challenge was accepted by providing the correct OTP. At STAGE FOUR, the authentication request is successful and sent back to the proxy server from the RADIUS server.

In various implementations, the step of determining whether to modify the request comprises performing a comparison of predetermined compatible authentication request formats with the received authentication request. Before the proxy server begins re-configuration of an authentication request forwarded by a RADIUS client, in some implementations of the present disclosure, a simulation tool is utilized within step 410 by the proxy server, through further execution of code on the processor housed within the proxy server. In some implementations, the proxy server is configured to compare the request with a predetermined compatible request captured by a simulation tool. An example of one such simulation tool is NTRadPing, and exemplary operation of NTRadPing in this context is displayed below as Table 3. In Table 3 below, simulation tool NTRadPing is checking the format of exchanged messages as well as identifying missing and unnecessary attributes in a RADIUS client request.

TABLE 3

| NTRadPing Example<br>NTRadPing Test Utility 1.5 - RADIUS Server Testing Tool | |
|---|---|
| RADIUS Server: | 127.0.0.1 |
| RADIUS port: | 1812 |
| Reply timeout (sec): | 30 |
| Retries | 6 |
| RADIUS Secret key: | Password |
| User-Name: | tony.stark |
| Password: | * |
| CHAP | |
| Request type: | Authentication Request |
| Additional RADIUS Attributes: | State=cb969e44-d4cb-4032-b5d2-eda5fffe36ec |
| State | Cb969e44-d4cb-4032-b |
| RADIUS Server reply: | Sending authentication request to server 127.0.0.1:1812<br>Transmitting packet, code=1 id=6 length=82<br>received response from the server in 891 milliseconds<br>reply packet code=11 id=6 length=151<br>response: Access-Challenge<br>••••••••••••••••••••••••••••••••••••••••••••••••••••••••attribute dump••••••••••••••••••••••••••••••••••••••••••••••••••••••••<br>State=cb969e44-d4cb-4032-b5d2-eda5fffe36ec<br>Reply-Message=OTP delivered to ***_***-1552. Please enter the value |

Once the identification step 410 (otherwise referred to as "validation" and "determination" throughout this disclosure) is complete, the proxy server proceeds to the second step 420: configuration of the RADIUS client. During this second step 420, the proxy server performs a series of modifications on the request to ensure its validity and compatibility with the RADIUS server's acceptable format. In various aspects, the RADIUS client runs software that uses a RADIUS protocol to communicate with a RADIUS server for authentication and authorization. In one or more embodiments, step 420 is a one-time step during an initial deployment stage intended to configure a RADIUS client. This configuration facilitates communication between the RADIUS client and the proxy server, and then on to a designated RADIUS server.

To configure the RADIUS client in step 420, the RADIUS client is provided with an internet protocol ("IP") address or fully qualified domain name ("FQDN") of the proxy server. An FQDN is a domain name that identifies a computer's exact location on the internet and is made up of two parts: the hostname and the domain name (for example, mymail-.somecollege.edu is an FQDN for a mail server). According to one or more implementations, once the RADIUS client is provided with an IP address or FQDN of the proxy server, the RADIUS client transmits the authentication request to the proxy server as if the proxy server were the designated RADIUS server. In some variations, the RADIUS server and proxy server exchange a shared secret used to encrypt the communication between the RADIUS client and proxy server. In primary implementations, this shared secret is generated by the RADIUS server which then transmit the shared secret to both the RADIUS client and proxy server to ensure end-to-end encryption. An example of one such shared secret is "FrrlZtAB9226." However, such shared secrets will usually vary considerably from instance to instance, based, in part, on custom enterprise RADIUS server configurations.

Third, the proxy server is configured during step 430 and sub-steps 440, 450, and 460, according to one or more variations of the present disclosure. At sub-step 440, an IP address or FQDN of the RADIUS client is provided to the proxy server as the source of the authentication request. Further, if a shared secret was used between the proxy server and RADIUS client for configuring the RADIUS client, that shared secret is entered into the proxy server at this stage to ensure requests are only coming from authorized RADIUS clients. One example of stage 440 incorporating a function to complete a portion of the proxy server configuration using FreeRADIUS is displayed below:

```
# A sample for configuring RADIUS Client on FreeRADIUS.
File path: /etc/raddb/clients.conf
client RADIUS-client {
  ipaddr = 10.x.x.x # RADIUS Client IP address
  secret = [shared secret]
}
```

In some implementations, after the IP address or FQDN for the RADIUS client is specified in sub-step 440, the process advances to sub-step 450 where an IP address or FQDN of the RADIUS server is specified for the proxy server. This marks the destination for the proxy server to send the access request after the request is valeted and, if necessary, modified for compatibility. Further, if a shared secret was used between the proxy server and RADIUS client for configuring the RADIUS client, that shared secret is prepared to be sent to the RADIUS server by the proxy server at this stage 450. Doing so ensures end-to-end encryption of requests sent from authorized RADIUS clients, passed to and through the proxy server, and then sent to the target RADIUS server. One example of stage 450 incorporating a function to complete a portion of the proxy server's configuration is displayed below:

```
# A sample for configuring RADIUS Server on the proxy
server. File path: /etc/raddb/proxy.conf
  realm company.com {
    type = RADIUS
    authhost = 10.x.x.x:[port] # RADIUS server IP
address
    secret = [ shared secret]
  }
```

In one or more implementations, after provision of the RADIUS server address to the proxy server sub-step 450, the proxy server is configured at sub-step 460 to ensure the validity and compatibility of the exchanged requests/responses between incompatible third-party RADIUS client and the RADIUS server. In further implementations of the present disclosure, the proxy server is further configured such that translating RADIUS server responses comprises the application of prescribed logic to accommodate the specific needs of or criteria defined by respective, different third-party RADIUS clients. In yet further implementations, the proxy server's translate and forward functions further comprises protocol conversion to ensure messages are compliant with RADIUS server communication standards. In additional implementations, the proxy server further comprises a FreeRADIUS server installed on a computing platform in communication with the RADIUS server and configured to implement modifications to the authentication requests.

For example, the proxy server may check if the request contains all required attributes and modify the request to match the required RADIUS server format. Below are some examples of functions using FreeRADIUS for modifying the request:

```
# Go to this file path /etc/raddb/sites-enabled/default
# Example to remove incompatible attributes from the
request:
update proxy-request {
    Message-Authenticator !* "ANY"
    Event-Timestamp !* "ANY"
    User-Name !* "ANY"
}
# Attributes to be updated in the response
update proxy-reply {
    ...
}
# Example to remove the incompatible attributes
conditionally.
  if ("% {User-Password}" !~ /^[0-9]+$/ && "% {State}" !~
/ [a-zA-Z0-9]/) {
    update proxy-request {
      User-Password !* "ANY"
    }
  }
```

Consistent with further implementations of the present disclosure, upon completion of step 430 and sub-steps 440, 450, and 460, the proxy server configuration is complete, and the process proceeds to step four (marked as step 470 in FIG. 4). At step four (470), the RADIUS server is configured to receive the authentication request from the proxy server for authentication and authorization. At step 470, the RADIUS server verifies the user inputs or other credentials used for multi-factor authentication. Examples of such inputs may include a user's login credentials or one-time password ("OTP"). At step 470, the RADIUS server is also configured by receiving electronic communication instructions, such instructions being generated through the execution of code in a processor housed within the proxy server. The RADIUS server is further configured during step 470 to return a response to the proxy server indicating whether the user is granted or denied access. Finally, at step 470, the proxy server performs a series of modifications to this RADIUS server response message (i.e., translations), as necessary and applicable, to ensure the response's validity and compatibility with impending transmission back to the RADIUS client.

In various aspects, the configuration of the RADIUS server and the third-party client is completed, in part, by a simulation tool to ensure detection of messages passed to the proxy server. In yet further aspects, a simulation tool is utilized to ensure translation of incoming and outgoing messages by the proxy server is matching the RADIUS server message compatibility requirements. In still further variations of the present disclosure, the step of translating of the RADIUS server response includes modifying attributes from the RADIUS server's response into a format compatible with the third-party RADIUS client.

It is to be understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. A computer-implemented method for enabling multi-factor authentication for incompatible third-party Remote Authentication Dial-In User Service ("RADIUS") clients using a proxy server, wherein the incompatible third-party RADIUS clients utilize authentication protocol versions or attribute formats that are natively incompatible with an expected format of the RADIUS server, the method comprising the following steps performed by a processor within the proxy server:

receiving, at the proxy server, an authentication request from a particular, third-party RADIUS client;

validating, at the proxy server, the received authentication request for compatibility with the RADIUS server prior to authentication, comprising comparing the received authentication request against one or more predetermined compatible authentication request formats to identify missing or superfluous attributes;

determining, at the proxy server, whether modification of the request is required prior to authentication;

modifying, at the proxy server, the received authentication request from the third-party RADIUS clients prior to authentication, if during the determining step it was determined that modification of the request is required, wherein the modifying comprises at least one of adding one or more missing attributes required by the RADIUS server or removing one or more superfluous attributes not required by the RADIUS server to ensure each of the received authentication request's validity and format compatibility with the RADIUS server for authentication and authorization;

forwarding, by the proxy server, the validated and modified authentication request to the RADIUS server;

receiving, at the proxy server, a response from the RADIUS server;

translating, at the proxy server, the response from the RADIUS server into a compatible format for the particular, third-party RADIUS client; and forwarding, by the proxy server, the response from the RADIUS server to the particular, third-party RADIUS client.

2. The method of claim 1, wherein validating the authentication request comprises identifying missing attributes required by the RADIUS server.

3. The method of claim 1, wherein determining whether to modify the request comprises performing a comparison of predetermined compatible authentication request formats with the received authentication request.

4. The method of claim 1, wherein modifying the authentication request includes adding required attributes to the request which were absent in the initial request received from the particular, third-party RADIUS client.

5. The method of claim 1, wherein the proxy server is configured to compare the request with a predetermined compatible request captured by a simulation tool.

6. The method of claim 1, wherein the step of receiving a response from the RADIUS server further includes determining, by the proxy server, whether a user is granted or denied access based on the response.

7. The method of claim 1, wherein the step of translating the RADIUS server response includes converting the RADIUS server's response attributes into a format compatible with the particular, third-party RADIUS client.

8. The method of claim 1, wherein the proxy server communicates with the RADIUS server using an encrypted communication channel employing a shared secret.

9. The method of claim 1, wherein translating the response includes applying prescribed logic by code executing in the processor to reflect specific criteria defined by the particular, third-party RADIUS client.

10. A system for enabling multi-factor authentication for incompatible third-party Remote Authentication Dial-In User Service ("RADIUS") clients, wherein the incompatible third-party RADIUS clients utilize authentication protocol versions or attribute formats that are natively incompatible with an expected format of a RADIUS server, the system comprising:

a proxy server; and a hardware processor, housed within and communicatively connected within the proxy server;

wherein the processor executes code that configures the proxy server to:

act as an intermediary between incompatible third-party RADIUS clients and a RADIUS server;

validate and modify authentication requests received from third-party RADIUS clients prior to authentication, comprising comparing each received authentication request against one or more predetermined compatible authentication request formats to identify missing or superfluous attributes, and adding one or more missing attributes required by the RADIUS server or removing one or more superfluous attributes not required by the RADIUS server to ensure each of the received authentication request's validity and format compatibility with the RADIUS server for authentication and authorization;

translate and forward modified authentication requests to the RADIUS server;

receive responses from the RADIUS server; and translate the responses into a format compatible with any given third-party RADIUS client among the third-party RADIUS clients.

11. The system of claim 10, wherein the proxy server is further configured by code executing in the processor in order to validate authentication requests by identifying missing or unnecessary attributes.

12. The system of claim 11, wherein the proxy server is further configured to specify required and superfluous attributes in relation to the RADIUS server's requirements.

13. The system of claim 10, wherein the proxy server is further configured to accept a shared secret for establishing secure communication with both a particular third-party RADIUS client among the third-party RADIUS clients and the RADIUS server.

14. The system of claim 10, wherein the proxy server is further configured such that translating RADIUS server responses comprises the application of prescribed logic to accommodate the specific needs of respective, different third-party RADIUS clients.

15. The system of claim 10, wherein the proxy server further comprises a FreeRADIUS server installed on a computing platform in communication with the RADIUS server and configured to implement modifications to the authentication requests.

16. The system of claim 10, wherein the system is further configured to identify and discard attributes from the authentication request that otherwise cause the RADIUS server to reject the request.

17. The method of claim 1, wherein the proxy server maintains a mapping of client-specific translation rules for each of the incompatible third-party RADIUS clients, and wherein the modifying is performed in accordance with the client-specific translation rules corresponding to the particular, third-party RADIUS client.

18. The system of claim 10, wherein the proxy server maintains a mapping of client-specific translation rules for each of the incompatible third-party RADIUS clients, and wherein the code further configures the proxy server to modify authentication requests in accordance with the client-specific translation rules corresponding to a given third-party RADIUS client among the third-party RADIUS clients.

* * * * *